(12) United States Patent
Urman et al.

(10) Patent No.: US 11,916,790 B2
(45) Date of Patent: Feb. 27, 2024

(54) CONGESTION CONTROL MEASURES IN MULTI-HOST NETWORK ADAPTER

(71) Applicant: Mellanox Technologies, Ltd., Yokneam (IL)

(72) Inventors: Avi Urman, Yokneam Illit (IL); Lior Narkis, Petah Tikva (IL); Noam Bloch, Bat Shlomo (IL); Eyal Srebro, Yokneam Moshava (IL); Shay Aisman, Haifa (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 71 days.

(21) Appl. No.: 16/865,567

(22) Filed: May 4, 2020

(65) Prior Publication Data
US 2021/0344600 A1 Nov. 4, 2021

(51) Int. Cl.
| | |
|---|---|
| *H04L 47/12* | (2022.01) |
| *H04L 47/10* | (2022.01) |
| *H04L 47/24* | (2022.01) |
| *H04L 47/26* | (2022.01) |
| *H04L 47/30* | (2022.01) |
| *H04L 47/32* | (2022.01) |
| *H04L 49/00* | (2022.01) |

(52) U.S. Cl.
CPC .............. *H04L 47/12* (2013.01); *H04L 47/10* (2013.01); *H04L 47/24* (2013.01); *H04L 47/30* (2013.01); *H04L 47/32* (2013.01); *H04L 47/326* (2013.01); *H04L 49/3045* (2013.01); *H04L 47/26* (2013.01); *H04L 47/29* (2013.01)

(58) Field of Classification Search
None
See application file for complete search history.

(56) References Cited

U.S. PATENT DOCUMENTS

| | | |
|---|---|---|
| 7,796,507 B2 | 9/2010 | Gholmieh et al. |
| 10,148,746 B2 | 12/2018 | Itkin et al. |

(Continued)

OTHER PUBLICATIONS

Cisco Systems, Inc., "Cisco IOS Quality of Service Solutions Configuration Guide", Release 12.2SR, pp. 291-324 (chapter "Congestion Avoidance"), year 2009.

(Continued)

*Primary Examiner* — Jay L Vogel
(74) *Attorney, Agent, or Firm* — Kligler & Associates Patent Attorneys Ltd.

(57) ABSTRACT

A network adapter includes a host interface, a network interface, a memory and packet processing circuitry. The memory holds a shared buffer and multiple queues allocated to the multiple host processors. The packet processing circuitry is configured to receive from the network interface data packets destined to the host processors, to store payloads of at least some of the data packets in the shared buffer, to distribute headers of at least some of the data packets to the queues, to serve the data packets to the host processors by applying scheduling among the queues, to detect congestion in the data packets destined to a given host processor among the host processors, and, in response to the detected congestion, to mitigate the congestion in the data packets destined to the given host processor, while retaining uninterrupted processing of the data packets destined to the other host processors.

18 Claims, 4 Drawing Sheets

(56) References Cited

U.S. PATENT DOCUMENTS

| | | | |
|---|---|---|---|
| 2006/0092836 A1* | 5/2006 | Kwan | H04L 47/283 370/229 |
| 2009/0106470 A1* | 4/2009 | Sharma | G06F 13/385 710/301 |
| 2011/0289242 A1* | 11/2011 | Srinivasan | G06F 13/102 710/22 |
| 2014/0269271 A1* | 9/2014 | Gafni | H04L 47/32 370/236 |
| 2015/0195209 A1* | 7/2015 | Bottorff | H04L 47/25 370/230 |
| 2015/0271244 A1 | 9/2015 | Bloch et al. | |
| 2016/0301614 A1* | 10/2016 | Concer | H04L 12/4641 |
| 2017/0339062 A1* | 11/2017 | Mayer-Wolf | H04L 47/12 |
| 2019/0052566 A1* | 2/2019 | Leib | H04L 47/12 |
| 2019/0379610 A1* | 12/2019 | Srinivasan | H04L 47/11 |
| 2020/0021532 A1* | 1/2020 | Borikar | H04L 47/28 |
| 2020/0127946 A1* | 4/2020 | Levi | H04L 45/745 |

OTHER PUBLICATIONS

EP Application # 21171368.0 Search Report dated Sep. 29, 2021.

\* cited by examiner

CONGESTION CONTROL MEASURES IN MULTI-HOST NETWORK ADAPTER

FIELD OF THE INVENTION

The present invention relates generally to data communication, and particularly to methods and systems for avoiding ingress congestion in a multi-host network adapter.

BACKGROUND

Multi-host computers comprise a plurality of host processors, which typically share the resources of a single network adapter ("multi-host network adapter"), to access a communication network. U.S. Pat. No. 10,148,746 describes a multi-host network adapter, including ports that are coupled to a switch in a network and circuitry that is coupled to a network node.

Ingress packets that a multi-host network adapter receives, destined to one of the plurality of hosts that share the network adapter, may be subject to congestion, for example, if the destination host is slow reading the packets from the network adapter. Congestion management techniques for ingress packets are described, for example, in U.S. Pat. No. 7,796,507, which describes a method of congestion control at a communication network node, including monitoring ingress data congestion conditions at the node and reducing ingress data rates responsive to detecting ingress data congestion.

SUMMARY

An embodiment of the present invention that is described herein provides a network adapter including a host interface, a network interface, a memory and packet processing circuitry. The host interface is configured to be connected to multiple host processors. The network interface is configured to communicate packets over a network. The memory is configured to hold (i) a shared buffer and (ii) multiple queues allocated to the multiple host processors. The packet processing circuitry is coupled between the host interface and the network interface and is configured to receive from the network interface data packets destined to the host processors, to store payloads of at least some of the data packets in the shared buffer, to distribute headers of at least some of the data packets to the queues, to serve the data packets to the host processors by applying scheduling among the queues, to detect congestion in the data packets destined to a given host processor among the host processors, and, in response to the detected congestion, to mitigate the congestion in the data packets destined to the given host processor, while retaining uninterrupted processing of the data packets destined to the other host processors.

In some embodiments, the packet processing circuitry is configured to mitigate the congestion by denying admission of one or more of the data packets to the shared buffer, based on the detected congestion. In an example embodiment, the packet processing circuitry is configured to randomly select the data packets that are denied admission to the shared buffer.

In some embodiments, the packet processing circuitry is configured to mitigate the congestion by causing the given host processor to send a congestion notification packet to the network. In an embodiment, the packet processing circuitry is configured to cause the given host processor to send the congestion notification packet to the network by setting an Explicit Congestion Notification (ECN) bit in the header of at least one of the data packets destined to the host processors.

In another embodiment, the packet processing circuitry is configured to mitigate the congestion by sending a congestion notification packet to the network. In yet another embodiment, the packet processing circuitry is further configured to receive one or more quality-of-service measures for at least one of the host processors, and to mitigate the congestion responsive to the quality-of-service measures. In still another embodiment, the packet processing circuitry is further configured to receive quality-of-service measures for at least two packet flows, and to mitigate the congestion responsive to the quality-of-service measures.

There is additionally provided, in accordance with an embodiment of the present invention, a network adapter including a host interface, a network interface, a memory and packet processing circuitry. The host interface is configured to be connected to a host that runs multiple workloads. The network interface is configured to communicate packets over a network. The memory is configured to hold (i) a shared buffer and (ii) multiple queues allocated to the multiple workloads. The packet processing circuitry is coupled between the host interface and the network interface and configured to receive from the network interface data packets destined to the workloads, to store payloads of at least some of the data packets in the shared buffer, to distribute headers of at least some of the data packets to the queues, to serve the data packets to the workloads by applying scheduling among the queues, to detect congestion in the data packets destined to a given workload among the host processors, and, in response to the detected congestion, to mitigate the congestion in the data packets destined to the given workload, while retaining uninterrupted processing of the data packets destined to the other workloads.

There is also provided, in accordance with an embodiment of the present invention, a method in a network adapter connected to multiple host processors and to a network. The method includes holding in a memory (i) a shared buffer and (ii) multiple queues allocated to the multiple host processors. Data packets destined to the host processors are received from the network. Payloads of at least some of the data packets are stored in the shared buffer. Headers of at least some of the data packets are distributed to the queues. The data packets are served to the host processors by applying scheduling among the queues. Congestion is detected in the data packets destined to a given host processor among the host processors. In response to the detected congestion, the congestion in the data packets destined to the given host processor is mitigated, while retaining uninterrupted processing of the data packets destined to the other host processors.

There is further provided, in accordance with an embodiment of the present invention, a method in a network adapter connected to a host and to a network. The method includes holding in a memory (i) a shared buffer and (ii) multiple queues allocated to multiple workloads running on the host. Data packets destined to the workloads are received from the network. Payloads of at least some of the data packets are stored in the shared buffer. Headers of at least some of the data packets are distributed to the queues. The data packets are served to the workloads by applying scheduling among the queues. Congestion is detected in the data packets destined to a given workload among the host processors. In response to the detected congestion, the congestion in the data packets destined to the given workload is mitigated, while retaining uninterrupted processing of the data packets destined to the other workloads.

The present invention will be more fully understood from the following detailed description of the embodiments thereof, taken together with the drawings in which:

DETAILED DESCRIPTION OF EMBODIMENTS

Overview

Figure 1:
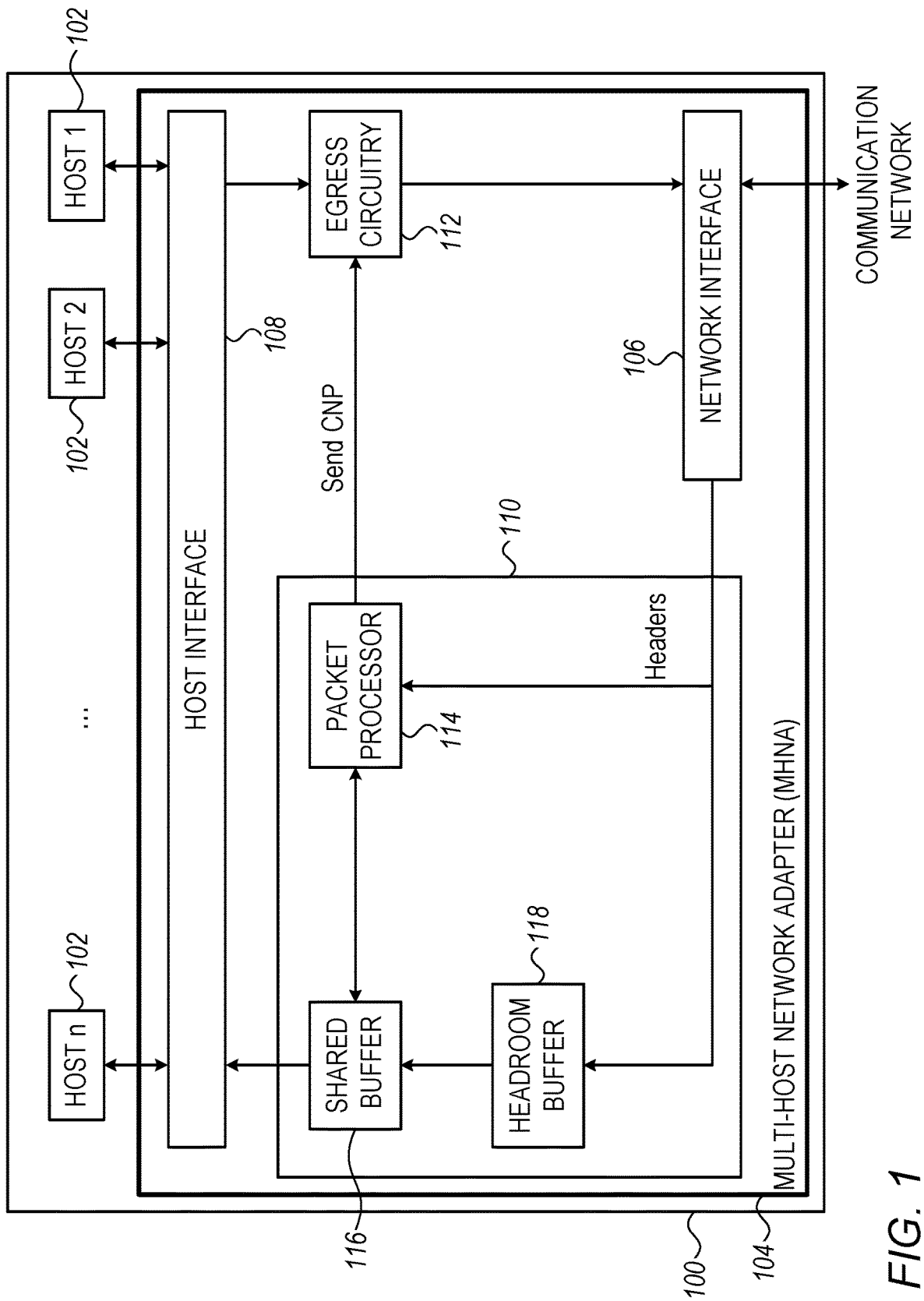
FIG. 1 is a block diagram that schematically illustrates a Multi-Host Computer, in accordance with an embodiment of the present invention.

Multi host network adapters (MHNAs) facilitate network connection to a plurality of hosts, e.g., host processors in a multi-host computer. Each host may access the MHNA through a global bus (e.g., Peripheral-Component-Interconnect-Express (PCIe)), independently of the other hosts. The MHNA should enforce Quality of Service (QoS) between the hosts; should ensure that the latency and the bandwidth of a host communicating with the network will be minimally affected by the communication of the other hosts; and, should allow efficient utilization of the MHNA resources by the hosts.

One of the key aspects that an MHNA should address is intelligent congestion management. Hosts that are connected to the MHNA may not be aware of each other, and the performance of a host should not affect the performance of the other hosts. In particular, head-of-queue blocking, wherein a packet that is destined to a busy host stalls the forwarding of further packets destined to other hosts, should be avoided. When congestion occurs, the MHNA should isolate the congested host (and possibly the congested flow within the host), so as to allow non-congested hosts or flows to continue network communication with little or no effect; in addition, the MHNA should take traffic-control actions that mitigate the congestion for the affected host or packet flow, without disrupting other hosts or flows.

Embodiments of the present invention that are disclosed herein provide for an MHNA that efficiently facilitates network access to a plurality of hosts that are independent of each other; the MHNA mitigates congestion by controlling the flow of packets, such that hosts which are not congested will hardly be affected. In embodiments, the MHNA supports QoS setting for the various hosts and for packet flows destined to the hosts.

In some embodiments, the ingress path of an MHNA comprises a shared buffer, which is dynamically divided into buffers in a Random Access Memory (RAM), wherein each buffer stores packets of a respective packet flow that is destined to a respective host. The MHNA manages the shared buffer and keeps track of the amount of used buffer space for each of the buffers. If any of the buffers is congested (e.g., the occupied space is close to the capacity of the buffer), the MHNA may take congestion mitigation actions, without affecting other buffers (and, hence, without affecting other hosts or flows).

In embodiments, the shared buffer comprises buffers that are statically allocated to packet flows and/or to hosts, and a common buffer that is dynamically allocated to packets that overflow from the allocated buffer, or to packets for which no buffer is allocated. In an embodiment, a buffer control circuitry is configured to manage the shared buffers and the common buffer, and to direct reading and writing of packets to the corresponding addresses in the RAM. In some embodiments, the shared buffer is configured to monitor the occupancy of the buffers, and to send congestion indications for the shared buffer and for the buffers that correspond to each packet flow.

In some embodiments, ingress packets first enter a headroom buffer, where the packets are stored until a queue-admission circuitry decides if the packets are to be dropped, or admitted to the shared buffer (the headroom buffer may store only a portion of the packet). If a packet is admitted, the packet header (or a representation of the packet header) enters, respective to the packet flow, one of a plurality of queues.

An arbiter within the MHNA is configured to select a header (or a representation of a header) from one of the queues, and to control the shared buffer to output the corresponding packet to the destined host.

In embodiments, in case of congestion the MHNA may take any or all of the following congestion mitigation actions:

a) add a congestion indication to the ingress packet. For example, set an Explicit Congestion Notification (ECN) bit in the packet header. This may cause the destined host to echo back the congestion notification in a response packet or send a congestion notification packet (CNP) to the peer network source that sent the ingress packet;

b) directly send a CNP to the peer network source;

c) drop the ingress packet (the peer network source may then indirectly detect congestion at the destination, and slow down the transmission rate).

In some embodiments, the decision which congestion mitigation action to take is determined responsive to the congestion measure. For example, the MHNA may take action a) if the congestion measure is above a first threshold and below a higher second threshold; take action b) above if the congestion measure is between the second threshold and a third threshold that is higher than the second threshold, and take action c) above if the congestion measure is above the third threshold (the MHNA will take no congestion mitigation actions if the congestion measure is below the first threshold).

In an embodiment, the decisions to take congestion mitigation actions described above are also contingent on a random selection test. For example, if the congestion measure is above the third threshold, the MHNA will run a random selection test, and decide to drop the packet only if the decision passes the random selection test.

In an embodiment, the random selection test is weighted, wherein packets that correspond to a high QoS flow or a high QoS host will have lower probability to be selected than packets that correspond to low QoS flows/hosts.

In some embodiments, the disclosed techniques are applied in a single-host environment. In such embodiments, a network adapter serves a host having multiple workloads, e.g., multiple Virtual Machines (VMs), multiple processes and/or multiple packet flows. The network adapter manages multiple queues that are assigned to the multiple workloads. The disclosed congestion control schemes are applied to the multiple queues.

More details will be disclosed in the System Description hereinbelow, with reference to example embodiments.

System Description

FIG. 1 is a block diagram that schematically illustrates a Multi-Host Computer 100, in accordance with an embodiment of the present invention. Multi-host computer 100 comprises a plurality of Host Processors 102, which communicate through a shared Multi-Host Network Adapter (MHNA) 104 with a communication network such as Ethernet or Infiniband™.

MHNA 104 comprises a network interface 106, which is configured to communicate packets over the network and comprises ingress and egress ports (not shown); a Host Interface 108, which is configured to communicate with host processors 102; an ingress processing circuitry 110, which is configured to manage ingress packets that the MHNA receives from the network via the network interface; and an egress circuitry 112, which is configured to manage egress packets that the MHNA sends to the network via the network interface. (The structure and functionality of Egress circuitry 112 are not described in the disclosures hereinbelow; Configurations for a multi-host egress circuit should be known to those skilled in the art.)

Ingress processing circuitry 110 comprises a Packet Processor 114, which is configured to process ingress packets responsive to the packet headers; a Shared Buffer 116, which is configured to temporarily store the ingress packets; and a Headroom Buffer 118, which is configured to forward ingress packets to the shared buffer.

If the rate at which the Packet Processor stores new ingress packets in Shared-Buffer 116 is higher than the rate at which the Packet Processor sends packets from the Shared Buffer to the corresponding Hosts 102, the Shared Buffer may be congested and, when there is no more room in the Shared-Buffer, packets may be lost.

In embodiments according to the present invention, the Packet Processor monitors a congestion measure of the Shared Buffer (e.g., the ratio of occupied buffer space divided by the total buffer space), and may mitigate the congestion, responsive to the congestion measure. In some embodiments, to mitigate the congestion, the packet processor may initiate sending a Congestion Notification Packet (CNP) to a source network element, either by requesting Egress Circuitry 112 to send the CNP, or by indicating to the destined host that the flow of the ingress packet is congested (e.g., by setting an Explicit Congestion Notification (ECN) bit in the packet), thereby causing the host to send the CNP.

In embodiments, packets that the MHNA receives may be classified to packet flows, based on fields of the packet headers such as source and destination (the latter typically including a host of hosts 102 to which the packets of the packet flow are destined). Packet flows may be assigned different Quality-of-Service (QoS) rates, and, hence, the packet processor is configured to assign different priorities to different packet flows.

The packet processor may allocate more storage area in shared-buffer 116 to Packets of a higher priority packet flow. In addition, if congestion in the Shared Buffer occurs, the packet processor may mitigate the congestion responsive to the priority of the packet flow. For example, the packet processor may send less CNP packets to the senders of high priority packet flows.

As packets from multiple packet queues that are destined to more than one host are routed to a shared buffer an handled independently of each other, head-of-queue blocking (e.g., blocking of all queues by a single queue which is congested) is avoided. This solution to head-of-queue blocking is referred to as Virtual Output Queuing, or VOQ.

In summary, MHNAs according to the present invention allow a plurality of hosts to communicate over a network. An egress circuitry, which is beyond the scope of the present disclosures, manages egress packets. Ingress packets are temporarily stored in a shared-buffer, and the MHNA manages congestion responsive to the QoS of the packet flows.

As would be appreciated, Multi-Host computer 100 and MHNA 104 illustrated in FIG. 1 and described hereinabove are cited by way of example. In alternative embodiments various suitable structures may be used. For example, Host-Interface 108 may be a Peripheral-Component-Interconnect-Express (PCIe) interface, wherein hosts 102 are coupled to the MHNA via a PCIe bus; other components such as memory may be connected to Hosts 102 and/or to MHNA 104. In some embodiments, MHNA 104 may be configured to send mirror and/or other diagnostics messages over the network and/or to hosts 102.

In embodiments, hosts 102 typically comprise a programmable processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
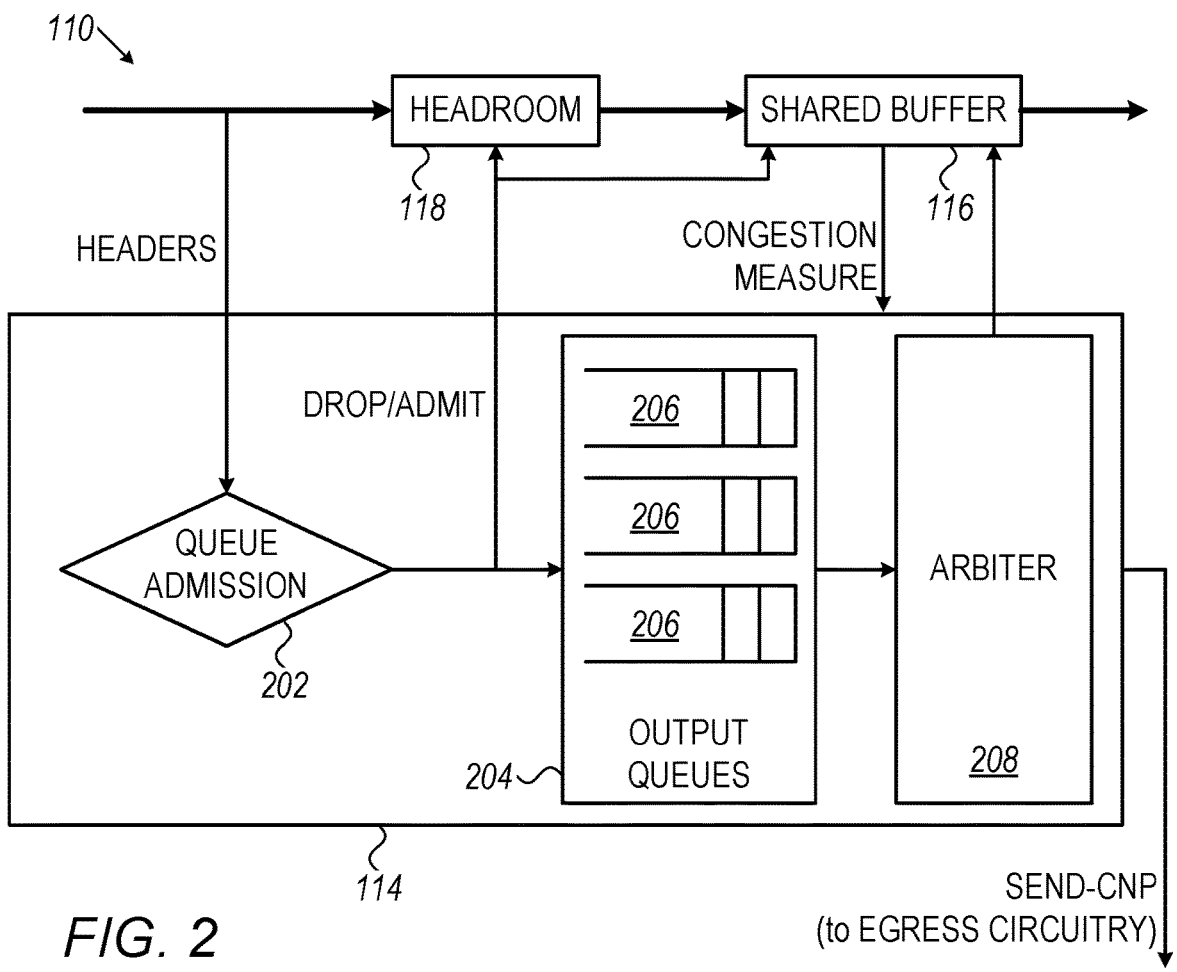
FIG. 2 is a block diagram that schematically illustrates an ingress processing circuitry in a Multi-Host-Network Adapter, in accordance with an embodiment of the present invention.

FIG. 2 is a block diagram that schematically illustrates an ingress processing circuitry 110 in an MHNA, in accordance with an embodiment of the present invention. The ingress processing circuitry comprises a Packet Processor 114, a Headroom Buffer 118 and a Shared buffer 116 (all of which are also illustrated in FIG. 1). Packet Processor 114 comprises a Queue-Admission Circuit 202, which is configured to approve or deny admission of packets; Output Queues 204 (which comprise a plurality of queues 206); and an Arbiter 208.

The Packet Processor receives packets from Network Interface 106 (FIG. 1) and stores the packets in Headroom Buffer 118, which is configured to temporarily store packets (or parts thereof) until the Queue-Admission Circuit decides whether to approve or deny admission to the packets (referred to as Admit packet or Drop packet, respectively), responsive to one or more fields of the packet header. If the Queue Admission Circuitry decides to drop a packet, the packet that is stored in the headroom buffer will be ignored (if only part of a packets is stored in the headroom buffer, that part and any remaining parts of the packet that are yet to be received from the network interface will be ignored). If Queue-Admission Circuitry 202 decides to admit the packet, the packet processor will store the packet in Shared Buffer 116, and store the packet header (or a representation thereof) in one of Queues 206 of Output Queues 204. The queue is selected by the Queue-Admission Circuitry, responsive to field or fields of the packet header. In case of a multicast packet, more than one queue may be selected.

Arbiter 208 is configured to select a packet header (or a packet header representation) from one of queues 206, and, respective to the selection, control Shared Buffer 116 to send the corresponding packet to the destined host processor 102 (FIG. 1). In some embodiment, Arbiter 208 is a round-robin (e.g., a Deficit-Round-Robin, (DRR)) selector; in other embodiments, arbiter 208 selects a queue 204 based on a priority, which the arbiter calculates respective to one or more of the QoS of the corresponding packet flow, the congestion measure of the corresponding packet flow, the lengths of queues 206 and a random factor.

Shared Buffer 116 is further configured to monitor congestions and send a congestion measure to the Packet Processor. In an embodiment, the congestion measure may be the size of the occupied buffer space; in another embodiment the measure may be any value respective to the size of the occupied buffer space, e.g., the ratio between occupied buffer space and total buffer space. In some embodiments, the congestion measure may comprise a plurality of values, corresponding to the occupied buffer space of portions of the shared buffer, which may be allocated to packet flows and/or to destined host processors.

Responsive to the congestion measure, to the QoS of the packet flow and to a random selection circuitry, the Packet Processor may drop an incoming packet, or initiate sending a Congestion Notification Packet (CNP) to a source network element, either by requesting Egress Circuitry 112 to send the CNP, or by indicating congestion to the destined host (e.g., by setting an Explicit Congestion Notification (ECN) bit in the packet header), thereby causing the host to send the CNP.

In some embodiments, the packet processor drops a packet or initiates a CNP respective to a random selection circuitry, similar to Random Early Detection (RED) or to Weighted Early Detection (WRED) (see, for example, CISCO IOS Quality of Service Solutions Configuration Guide, Release 12.2 updated Jan. 30, 2014, Congestion Avoidance chapter). In other words, the packet processor decides to take a congestion mitigation action such as dropping a packet or sending a CNP, based on the congestion measure, on the QoS of the packet flow and on a random test. The random test may be weighted-random, wherein the probability to take a congestion mitigation action is lower for packets of high QoS flows.

As would be appreciated, Packet Processor 114 illustrated in FIG. 2 and described hereinabove is cited by way of example. In alternative embodiments, various suitable structures may be used. For example, in some embodiments packet processor 114 may, responsive to congestion in a high-QoS flow, control Shared-Buffer 116 to increase the buffer space that is allocated to the high-QoS flow.

Figure 3:
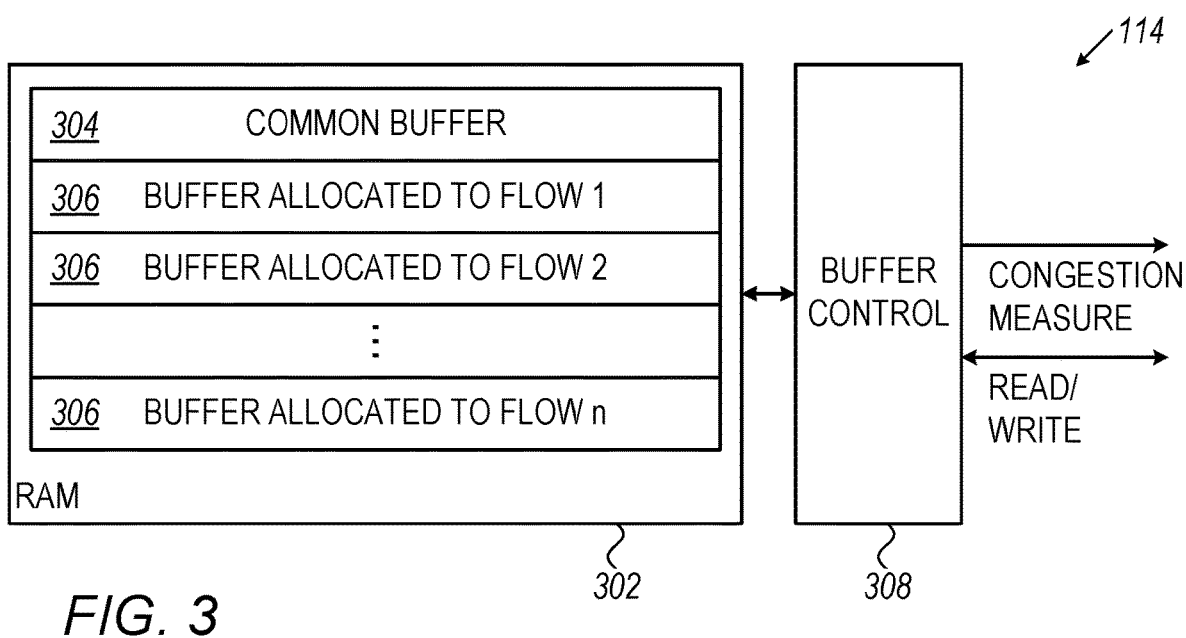
FIG. 3 is a block diagram that schematically illustrates the structure of a shared buffer, in accordance with an embodiment of the present invention.

FIG. 3 is a block diagram that schematically illustrates the structure of Shared Buffer 116 (FIG. 2), in accordance with an embodiment of the present invention. The Shared Buffer comprises a RAM 302 such as a Static Random Access Memory (SRAM) or a Dynamic Random Access Memory (DRAM), which is divided to a Common Buffer 304 and a plurality of Buffers 306 that are allocated to different packet flows. The division of RAM 302 to buffers, including the number of buffers and the size that is allocated to each buffer, may occasionally change, by software or by hardware control. At any period of time RAM 302 may also include space which is not allocated to any buffer, and/or space which is allocated to other purposes, beyond the scope of the present disclosure.

Common Buffer 304 may increase the flexibility of buffer allocation; for example, if a buffer allocated to a packet flow fills up, excess packets may be stored in the Common Buffer. In some embodiments, the MHNA statically allocates buffers 306 (e.g., upon system restart), and dynamically allocates portions of Common Buffer 304 to congested buffers of Buffers 306. In other embodiments, other suitable algorithms may be used to decide when packets are stored in the shared buffer.

A Buffer Control circuit 308 monitors and controls the buffers. The Buffer Control may store, for each of Buffers 306, pointers to a Write address, a Read address, the start of the buffer space and the end of the buffer space. Thus, when Shared Buffer 116 receives a packet which is to be stored in one of Buffers 306, the Buffer Control will generate Write addresses for the input packet, starting with the next free location in the corresponding buffer, wrapping around the buffer boundaries, and advance the Write pointer accordingly. Similarly, when packets of a packet flow are read from the Shared Buffer, Buffer Control 308 will generate Read addresses, and update the Read pointer.

Buffer Control 308 further calculates a congestion measure, for the complete shared buffer and/or for each of Buffers 306, respective to the Write and Read pointers; the Shared Buffer sends the congestion measure to Packet Processor 114 (FIG. 1).

The control and monitoring of Common Buffer 304 may be done similarly to the control and monitoring of Buffers 306 (that is—Common Buffer 304 may comprise sub-buffers allocated to overflows from buffers 306; the sub-buffers are controlled by Buffer Control 308). For flows of packets that are partly stored in a Buffer 306 and partly in Common Buffer 304, Buffer Control 308 may generate a congestion control which aggregates the corresponding congestion in Common Buffer 304 and in the allocated Buffer 306.

As would be appreciated, Shared Buffer 116 illustrated in FIG. 3 and described hereinabove is cited by way of example. In alternative embodiments various suitable structures may be used. For example, in some embodiments RAM 302 may comprise a plurality of memories; in an embodiment RAM 302 comprises a slower large RAM and a cache memory that stores frequently accessed entries; in some embodiments, RAM 302 is divided to segments, and a variable number of segments may be allocated to each packets flow. In an embodiment there is no common buffer. In some embodiments, if the number of concurrently served packet flows is larger than the number of Buffers 306, two or more packet flows may share the same Buffer 302.

Figure 4:
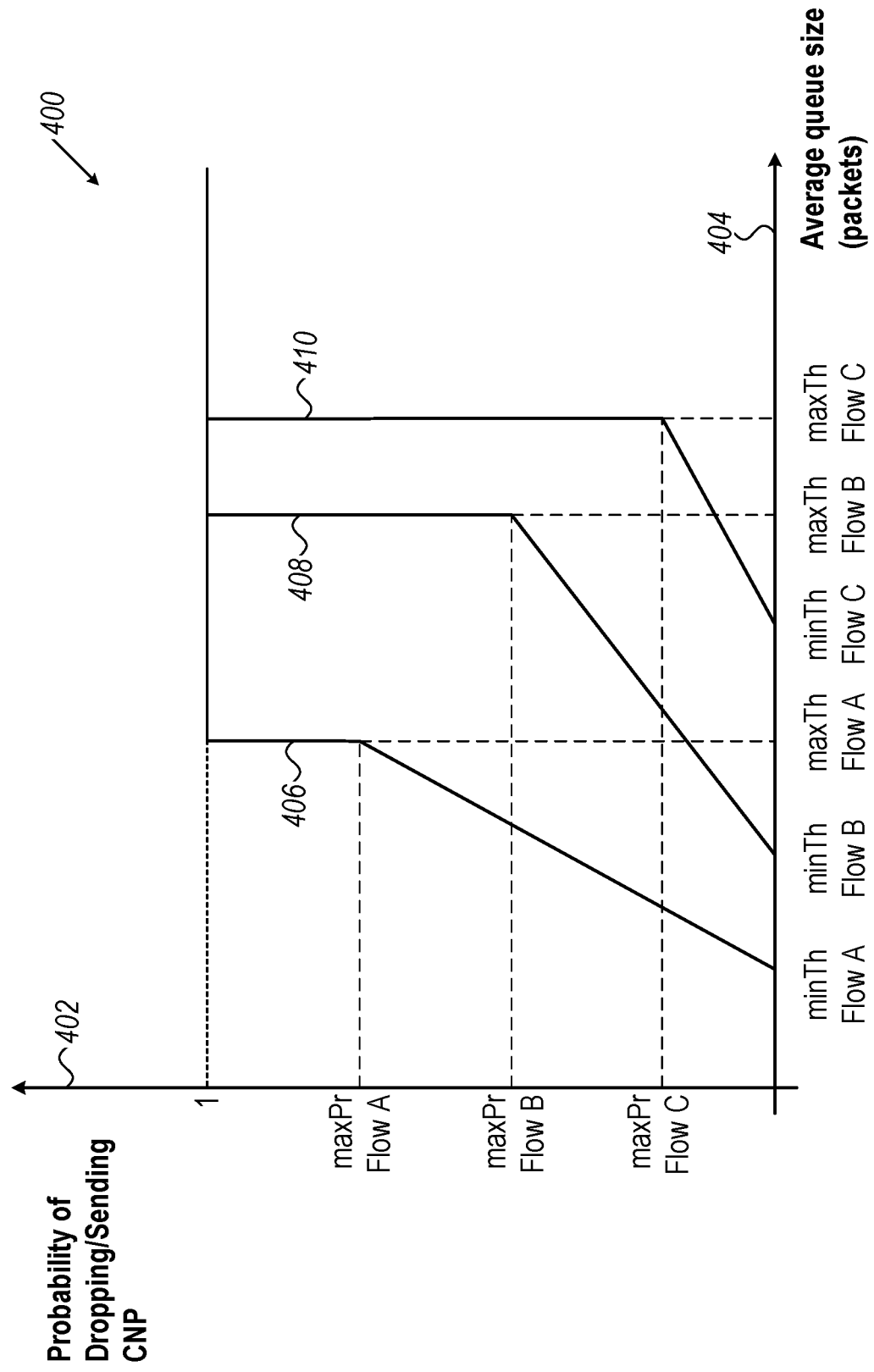
FIG. 4 is a chart that schematically illustrates drop/send Congestion Notification Packet (CNP) probabilities of three flows, in accordance with an embodiment of the present invention.

FIG. 4 is a chart 400 that schematically illustrates drop/send CNP probabilities of three flows, in accordance with an embodiment of the present invention. The chart plots the probabilities to take a congestion mitigation action (e.g., to drop a packet or to send a CNP) for three different packet flows—A, B and C.

A vertical axis 402 represents the probability, from 0 to 1. A horizontal axis 404 represents the average size of the corresponding queue (in packets or in bytes). A graph 406 plots the probability to take a congestion mitigation action for packet-flow A, a graph 408 plots the probability for packet-flow B and a graph 410 plots the probability for packet-flow C. For each of the three flows, three parameters are defined—minimum threshold, maximum threshold and maximum-probability. The probability to take a congestion mitigation action is, according to the example embodiment illustrated in FIG. 4:

$$P = (QS < \text{Min } Th)?0:(QS > \text{Max } Th)?1:(QS - \text{Min } Th) * \text{Slope}$$

Where QS is Queue Size, Min Th is minimum threshold, Max Th is maximum threshold, MaxPr is maximum probability and slope=MaxPr/(Max Th−Min Th).

Different Min Th, Max Th and MaxPr can be assigned to various packet flows (and, hence, to each host 102). The parameters may be set responsive to the QoS of the flows, and may change dynamically for new flows or in response to performance monitoring that the network adapter may run. Parameters used for the different congestion mitigation actions (e.g., packet dropping, indication to the Egress Circuitry to send a CNP and indication to the destined host to send a CNP), and for different packet flows may be separately set.

As would be appreciated, the chart illustrated in FIG. 4 is cited by way of example. Other suitable charts representing the probability to take congestion mitigation actions may be used. In some embodiments, for example, the probability may be a non-linear function of the queue size and in another embodiment the probability may be a piece-wise linear approximation of a non-linear function.

Figure 5:
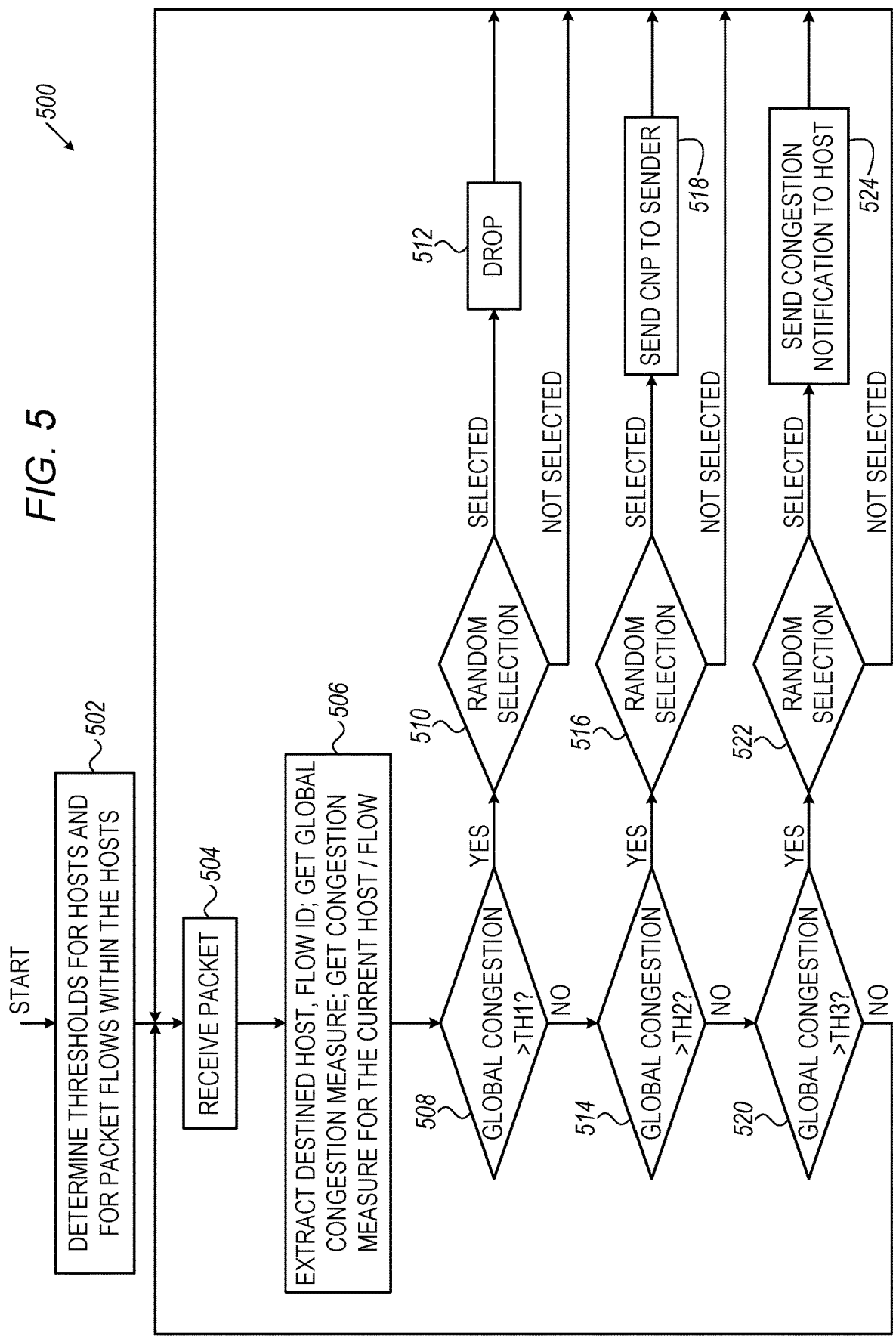
FIG. 5 is a flowchart that schematically illustrates a method for congestion mitigation in a multi-host network adapter, in accordance with an embodiment of the present invention.

FIG. 5 is a flowchart 500 that schematically illustrates a method for congestion mitigation in a multi-host network adapter, in accordance with an embodiment of the present invention. The flowchart is executed by packet processor 114 (FIG. 1), and starts at a Determining Thresholds step 502, wherein the packet processor determines thresholds of the congestion mitigation, for various packet flows.

Next the packet processor, at a Receive-Packet step 504, receives the next packet from Network Interface 106 (FIG. 1), and enters an Extracting Parameters step 506.

In step 506, the packet processor extracts the flow characteristics from the packet header, including destination host and packet flow, and extracts a global congestion measure (e.g., the total occupied space of Shared Buffer 116).

Three thresholds are used by the method illustrated in FIG. 5—TH1, TH2 and TH3, wherein TH1>TH2>TH3. At a Checking First Threshold step 508, the packet processor checks if the global congestion measure is greater than TH1. If so, the packet processor enters a Random Selection step 510, and randomly determines whether to drop the packet, in a Dropping Packet step 512, or to bypass step 512. TH1 indicates a high degree of congestion, which implies that the empty space in the shared buffer is close to exhaustion. To prevent dropping of high QoS flow packets, random selection step 510 is more likely to drop packets of low QoS flows than packets of high QoS flows. This is achieved by the settings of Min Th, Max Th and MaxPr (FIG. 4) for the flow of the current packet.

If, in step 508, the congestion measure is not higher than TH1, the packet processor enters a Checking Second Threshold step 514, and checks if the congestion measure is higher than TH2. If so, the packet processor will enter a random Select step 516, which is similar to step 510 but with different random-selection parameters, and then, respective to the random selection, either enters or skips a Sending CNP step 518. In step 518, the processor sends a Send-CNP indication (e.g., sets an ECN bit in the packet header) to Egress Circuitry 112 (FIG. 1).

If, in step 514, the congestion measure is not higher than TH2, the packet processor enters a Checking Third Threshold step 520, and checks if the congestion measure is higher than TH3. If so, the packet processor will enter a random Select step 522, which is similar to steps 510 and 516 but with different random-selection parameters, and then, respective to the random selection, either enter or skip a Sending Congestion Notification step 524. In step 524, the processor sends a congestion notification to the destined host (e.g., marks the header of the received packet); the destined host, when receiving the indication, may send a CNP packet to the source network element.

The packet processor will re-enter step 504 to receive the next packet in the following cases:

i) If, in step 520, the congestion measure is not larger than TH3;
ii) following steps 512, 518, 524;
iii) if in steps 510, 516, 522 the packets are not selected.

The random selection algorithms used in any or all of steps 510, 512, 522 may be similar to WRED and have a drop probability that depends on the congestion measure following, for example, the graphs of FIG. 4.

It should be noted that it is not always possible for the host to send a CNP (for example, in TCP it is not supported). In those cases, Step 520 should always be followed by re-entering step 504. This can be done, for example, by setting TH3<TH2.

In summary, according to the example embodiment illustrated in FIG. 5, the packet processor takes a congestion mitigation action according to the severity of the congestion and the QoS of the packet flow; for the most severe congestion, packets are randomly dropped; with medium severity congestion, the packet processor randomly controls the Egress Circuitry to send a CNP, and for the least severe congestion, the packet processor randomly indicates congestion to the destined host, which, in turn, may send a CNP to the source network element. In either case, the probability to take the congestion mitigation action is determined respective to the QoS of the corresponding packet flow—high QoS packets will be less frequently dropped, less frequently cause the Egress Circuitry to send CNPs and less frequently indicate congestion to the destined host (which will less frequently send CNPs).

As would be appreciated, the flow-chart illustrated in the example embodiment of FIG. 5 and described above is cited by way of example. Other suitable flowcharts may be used in alternative embodiments. For example, steps 508, 514 and 520, wherein the congestion measure is compared to three thresholds, may be done concurrently, followed by a random select step and one of Drop, Send CNP or Send Congestion Notification steps according to the threshold comparison results. In some embodiments, the congestion measures of the corresponding flow may be used rather than the global congestion, in either or all of steps 508, 514, 520, 510, 516 and 522.

Congestion Control in in Single-Host Systems

In other embodiments of the present invention, the techniques described hereinabove may be used in a single-host system, in which a host runs multiple workloads. Non-limiting examples of workloads comprise Virtual Machines (VMs), processes and packet flows. the disclosed congestion control schemes may also be used, for example, in hairpin traffic that is destined to the network (after rerouting in the network adapter).

In some embodiments, a network adapter serves the single host, and manages multiple queues that are assigned to the ingress traffic of the various workloads. The In a multi-VM system, for example, each VM may have a dedicated queue, and the disclosed congestion-control techniques may be applied to VM queues rather than to host-queues. In other embodiments, the techniques may be applied to application queues with VM processes, and in yet other embodiments the disclosed techniques may be applied to queues that are allocated to different flow-types (e.g., a separate queue is allocated to video packets), for example.

The configuration of the MHNA, including units and sub-units thereof, flowchart and probability chart, illustrated in FIGS. 1 through 5, are example configurations and charts that are depicted purely for the sake of conceptual clarity. Any other suitable configurations and charts can be used in alternative embodiments. The different MHNA elements may be implemented using suitable hardware, such as in one or more Application-Specific Integrated Circuit (ASIC) or Field-Programmable Gate Arrays (FPGA), using software, or using a combination of hardware and software elements.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A network adapter, comprising: a host interface, which is configured to be connected through a direct bus connection to multiple host processors; a network interface, which is configured to communicate packets over a network; a memory configured to hold (i) a shared buffer for the multiple host processors and (ii) multiple queues allocated to the multiple host processors; and packet processing circuitry, coupled between the host interface and the network interface and configured to: receive from the network interface data packets destined to the multiple host processors; store payloads of data packets destined to the multiple host processors in the shared buffer, distribute headers of the data packets whose payloads are stored in the shared buffer to the multiple queues and serve the data packets to the host processors by applying scheduling among the multiple queues; detect congestion in the data packets destined to a given host processor among the host processors; and in response to the detected congestion, decide on a congestion mitigation action to take in order to mitigate the congestion, from a plurality of congestion mitigation actions the packet processing circuitry is configured to apply, and apply the decided action to data packets destined to the given host processor, while retaining uninterrupted processing of the data packets destined to the other host processors, wherein the plurality of congestion mitigation actions the packet processing circuitry is configured to apply comprise: sending a congestion notification to the given host processor, causing the given host processor to send a congestion notification packet to the network, and directly sending a congestion notification packet to the network, and wherein the packet processing circuitry does not decide on sending a congestion notification to the given host processor if the host does not support sending a congestion notification packet, wherein the packet processing circuitry sets separate thresholds for sending a congestion notification to the given host processor and for directly sending a congestion notification packet to the network, the separate thresholds comprising different values.

2. The network adapter according to claim 1, wherein the plurality of congestion mitigation actions further comprise denying admission of one or more of the data packets to the shared buffer, based on the detected congestion.

3. The network adapter according to claim 2, wherein the packet processing circuitry is configured to randomly select the data packets that are denied admission to the shared buffer.

4. The network adapter according to claim 1, wherein the packet processing circuitry is configured to cause the given host processor to send the congestion notification packet to the network by setting an Explicit Congestion Notification (ECN) bit in the header of at least one of the data packets destined to the host processors.

5. The network adapter according to claim 1, wherein the packet processing circuitry is further configured to receive one or more quality-of-service measures for at least one of the host processors, and to mitigate the congestion responsive to the quality-of-service measures.

6. The network adapter according to claim 1, wherein the packet processing circuitry is further configured to receive quality-of-service measures for at least two packet flows, and to mitigate the congestion responsive to the quality-of-service measures.

7. The network adapter according to claim 1, wherein the host interface is configured to be connected through the bus to multiple host processors belonging to a single multi-host computer.

8. The network adapter according to claim 1, wherein the host interface is configured to be connected to the multiple host processors through a Peripheral-Component-Interconnect-Express (PCIe) bus.

9. The network adapter according to claim 1, wherein the packet processing circuitry decides on a congestion mitigation action to take responsive to comparison of a congestion measure to thresholds.

10. The network adapter according to claim 1 wherein the packet processing circuitry sets the threshold for sending a congestion notification to the given host at a level preventing sending a congestion notification to the given host, if the host does not support sending a congestion notification packet.

11. A network adapter, comprising: a host interface, which is configured to be connected through a direct bus connection to a host that runs multiple workloads; a network interface, which is configured to communicate packets over a network; a memory configured to hold (i) a shared buffer for the multiple workloads and (ii) multiple queues allocated to the multiple workloads; and packet processing circuitry, coupled between the host interface and the network interface and configured to: receive from the network interface data packets destined to the multiple workloads; store payloads of data packets destined to the multiple workloads in the shared buffer, distribute headers of the data packets whose payloads are stored in the shared buffer to the multiple queues, and serve the data packets to the workloads by applying scheduling among the multiple queues; detect congestion in the data packets destined to a given workload among the multiple workloads; and in response to the detected congestion, decide on a congestion mitigation action to take in order to mitigate the congestion, from a plurality of congestion mitigation actions the packet processing circuitry is configured to apply, and apply the decided action to data packets destined to the given workload, while retaining uninterrupted processing of the data packets destined to the other workloads, wherein the plurality of congestion mitigation actions the packet processing circuitry is configured to apply comprise: sending a congestion notification to the given host processor, causing the host to send a congestion notification packet to the network, and directly sending a congestion notification packet to the network, and wherein the packet processing circuitry does not decide on sending a congestion notification to the given host processor, if the host does not support sending a congestion notification packet, wherein the packet processing circuitry sets separate thresholds for sending a congestion notification to the given host processor and for directly sending a congestion notification packet to the network, the separate thresholds comprising different values.

12. A method in a network adapter connected through a direct bus connection to multiple host processors and connected to a network, the method comprising: holding in a memory (i) a shared buffer for the multiple host processors and (ii) multiple queues allocated to the multiple host processors; receiving from the network data packets destined to the host processors; storing payloads of data packets destined to the multiple host processors in the shared buffer, distributing headers of the data packets whose payloads are stored in the shared buffer to the multiple queues, and serving the data packets to the host processors by applying scheduling among the multiple queues; detecting congestion in the data packets destined to a given host processor among the host processors; and in response to the detected congestion, deciding on a congestion mitigation action to take in order to mitigate the congestion, from a plurality of congestion mitigation actions, and apply the decided action to data packets destined to the given host processor, while retaining uninterrupted processing of the data packets destined to the other host processors wherein the plurality of congestion mitigation actions comprise: sending a congestion notification to the given host processor, causing the given host processor to send a congestion notification packet to the network, and directly sending a congestion notification packet to the network, and wherein sending a congestion notification to the given host processor is not decided on, if the host does not support sending a congestion notification packet, wherein separate thresholds are set for sending a congestion notification to the given host processor and for directly sending a congestion notification packet to the network, the separate thresholds comprising different values.

13. The method according to claim 12, wherein the plurality of congestion mitigation actions further comprise denying admission of one or more of the data packets to the shared buffer, based on the detected congestion.

14. The method according to claim 13, wherein denying the admission comprises randomly selecting the data packets that are denied admission to the shared buffer.

15. The method according to claim 12, wherein causing the given host processor to send the congestion notification packet comprises setting an Explicit Congestion Notification (ECN) bit in the header of at least one of the data packets destined to the host processors.

16. The method according to claim 12, further comprising receiving one or more quality-of-service measures for at least one of the host processors, and mitigating the congestion responsive to the quality-of-service measures.

17. The method according to claim 12, further comprising receiving quality-of-service measures for at least two packet flows, and mitigating the congestion responsive to the quality-of-service measures.

18. A method in a network adapter connected through a direct bus connection to a host and connected to a network, the method comprising: holding in a memory (i) a shared buffer for multiple workloads running on the host and (ii) multiple queues allocated to the multiple workloads; receiving from the network data packets destined to the workloads; storing payloads of data packets destined to the multiple workloads in the shared buffer, distributing headers of the data packets whose payloads are stored in the shared buffer to the multiple queues, and serving the data packets to the workloads by applying scheduling among the multiple queues; detecting congestion in the data packets destined to a given workload among the multiple workloads; and in response to the detected congestion, deciding on a congestion mitigation action to take in order to mitigate the congestion, from a plurality of congestion mitigation actions a packet processing circuitry of the network adapter is configured to apply, and apply the decided action to data packets destined to the given workload, while retaining uninterrupted processing of the data packets destined to the other workloads, wherein the plurality of congestion mitigation actions comprise: sending a congestion notification to the given host processor, causing the host to send a congestion notification packet to the network, and directly sending a congestion notification packet to the network, and wherein the packet processing circuitry does not decide on sending a congestion notification to the given host processor, if the host does not support sending a congestion notification packet wherein the packet processing circuitry sets separate thresholds for sending a congestion notification to the given host processor and for directly sending a congestion notification packet to the network, the separate thresholds comprising different values.

* * * * *